United States Patent
Davis et al.

(10) Patent No.: US 7,139,253 B2
(45) Date of Patent: Nov. 21, 2006

(54) PACKET SWITCHES

(75) Inventors: Simon Paul Davis, Romsey (GB); Andrew Reeve, Winchester (GB)

(73) Assignee: Roke Manor Research Limited, Romsey (GB)

( * ) Notice: Subject to any disclaimer, the term of this patent is extended or adjusted under 35 U.S.C. 154(b) by 867 days.

(21) Appl. No.: 09/898,486

(22) Filed: Jul. 5, 2001

(65) Prior Publication Data

US 2002/0024953 A1 Feb. 28, 2002

(30) Foreign Application Priority Data

Jul. 5, 2000 (GB) ............................................. 0016476
Oct. 10, 2000 (GB) ............................................. 0024737

(51) Int. Cl.
*H04Q 11/04* (2006.01)

(52) U.S. Cl. ......................... 370/328; 370/401; 370/376
(58) Field of Classification Search ......... 370/216–224, 370/230–235, 241–244, 237–238.1, 328, 370/338, 401, 409; 714/1–5; 709/207, 223–225, 709/238, 243
See application file for complete search history.

(56) References Cited

U.S. PATENT DOCUMENTS

| | | | | |
|---|---|---|---|---|
| 5,463,620 A | * | 10/1995 | Sriram | ........................ 370/412 |
| 5,982,771 A | * | 11/1999 | Caldara et al. | ............. 370/389 |
| 6,044,061 A | | 3/2000 | Aybay et al. | |
| 6,195,335 B1 | * | 2/2001 | Calvignac et al. | .......... 370/236 |
| 6,314,487 B1 | * | 11/2001 | Hahn et al. | .................. 710/317 |
| 6,442,172 B1 | * | 8/2002 | Wallner et al. | ............. 370/416 |
| 6,529,476 B1 | * | 3/2003 | Magnussen | ................ 370/235 |
| 6,542,507 B1 | * | 4/2003 | Khacherian et al. | ... 370/395.43 |
| 6,625,160 B1 | * | 9/2003 | Suzuki | ........................ 370/413 |
| 6,654,343 B1 | * | 11/2003 | Brandis et al. | ............. 370/229 |
| 6,707,824 B1 | * | 3/2004 | Achilles et al. | ............. 370/412 |
| 6,747,971 B1 | * | 6/2004 | Hughes et al. | ............... 370/387 |
| 6,757,246 B1 | * | 6/2004 | Alasti et al. | ................. 370/230 |
| 6,804,731 B1 | * | 10/2004 | Chang et al. | .................. 710/53 |

FOREIGN PATENT DOCUMENTS

| | | |
|---|---|---|
| EP | 0458438 A2 | 11/1991 |
| EP | 0 844 763 A2 | 11/1997 |
| GB | 2 297 881 A | 2/1995 |
| WO | WO-9826509 A1 | 6/1998 |

OTHER PUBLICATIONS

British Search Report.
N. McKeown et al., Tiny Tera: A Packet Switch Core IEEE Micro, 17(1):26–33 (1997) New York, U.S.
European Search Report mailed Jan. 30, 2004.

* cited by examiner

*Primary Examiner*—Zarni Maung
*Assistant Examiner*—Van Kim T. Nguyen
(74) *Attorney, Agent, or Firm*—Crowell & Moring LLP

(57) ABSTRACT

A router device has a plurality of ingress line interface cards (LICs), a plurality of egress LIC's, a backplane and a controller. Transmission of signals from the ingress LICs to the controller, and from the controller to each of the ingress and egress LICs takes place across the backplane. Each ingress LIC is provided with a dedicated timeslot in which it can send information to the controller via connection. Information is sent in a slice within the dedicated timeslot and each egress LIC ignores data sent by a given ingress LIC within the timeslot assigned to said ingress LIC. A similar system is used for transmission of communications from the controller to the LICs. It is thus possible to avoid provision of additional, dedicated communications paths between the LICs (ingress and egress) and the controller.

8 Claims, 3 Drawing Sheets

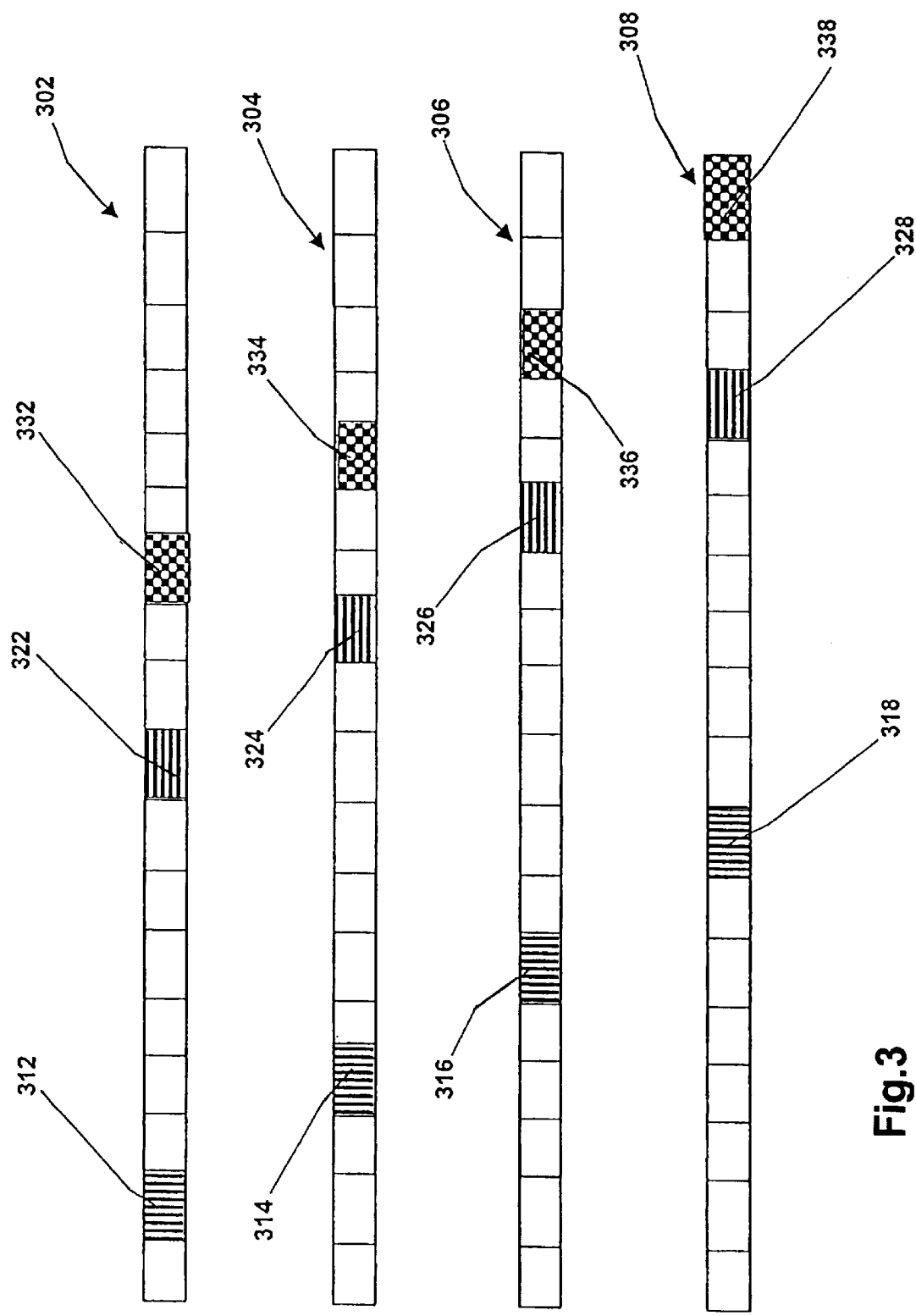

PACKET SWITCHES

BACKGROUND OF THE INVENTION

The present invention relates to improvements in or relating to switching devices and is more particularly concerned with a technique for transmitting control information across a switching device.

Data is transferred over the Internet by means of a plurality of packet switches in accordance with a standard protocol known as Internet Protocol (IP). IP is a protocol based on the transfer of variable sized portions of data known as packets. All network traffic involves the transportation of packets of data. Packet switches are devices for accepting incoming packets; temporarily storing each packet; and then forwarding the packets to another part of the network. A packet switch receives packets of data on a plurality of input ports and transfers each packet to a specific one of a plurality of output ports. The packets of data can be of variable length or of fixed length. A packet switch may include a router, or routing device, or a circuit switch.

Traffic volume in the Internet is growing exponentially, almost doubling every 3 months, and the capacity of conventional IP routers is insufficient to meet this demand. There is thus an urgent requirement for products that can route IP traffic at extremely large aggregate bandwidths in the order of several terabits per second. Such routing devices are termed "terabit routers".

Terabit routers require a scalable high capacity communications path between the point at which packets arrive at the router (the "ingress") and the point at which the packets leave the router (the "egress").

The packets transferred in accordance with IP can (and do) vary in size. Within routers it has been found useful to pass data in fixed sized units. In routers then data packets are partitioned into small fixed sized units, known as cells.

One suitable technique for implementing a scalable communications path is a backplane device, known as a cell based cross-bar. Data packets are partitioned into cells by a plurality of ingress means for passage across the cross-bar.

The plurality of ingress means provide respective interfaces between incoming communications channels carrying incoming data and the cross-bar. Similarly a plurality of egress means provide respective interfaces between the cross-bar and outgoing communications channels carrying outgoing data.

A general terabit router architecture bears some similarity to conventional router architecture. Packets of data arrive at input port(s) of ingress means and are routed as cells across the cross-bar to a predetermined egress means which reassembles the packets and transmits them across its output port(s). Each ingress means maintains a separate packet queue for each egress means.

The ingress and egress means may be implemented as line interface cards (LICs). Since one of the line functions regularly undertaken by the ingress and egress means is forwarding, LICs may also be known as 'forwarders'. Further functions include congestion control and maintenance of external interfaces, input ports and output ports.

In a conventional cell based cross-bar, each ingress means is connected to one or more of the egress means. However, each ingress means is only capable of connecting to one egress means at any one time. Likewise, each egress means is only capable of connecting to one ingress means at a time.

All ingress means transmit in parallel and independently across the cross-bar. Furthermore, cell transmission is synchronized with a cell cycle, having a period of, for example, 108.8 ns.

The ingress means simultaneously each transmit a new cell with each new cell cycle. The pattern of transmissions from the ingress means across the cross-bar to the egress means changes at the end of every cell cycle.

A cross-bar controller is provided for efficient allocation of the bandwidth across the cross-bar. It calculates the rates that each ingress means must transmit to each egress means. This is the same as the rate at which data must be transmitted from each packet queue. The calculation makes use of real-time information, including traffic measurements and indications from the ingress means. The indications from the ingress means include monitoring the current rates, queue lengths and buffer full flags. The details of the calculation are discussed more rigorously in the copending British Patent Application Number 9907313.2 (docket number F21558/98P4863).

The cross-bar controller performs a further task; it serves to schedule the transfer of data efficiently across the cross-bar while maintaining the calculated rates. At the end of each cell cycle, the cross-bar controller communicates with the ingress and egress means as follows. First, the cross-bar controller calculates and transmits to each ingress means the identity of the next package queue from which to transmit. Secondly, the cross-bar controller calculates and transmits to each egress means the identity of the ingress from which it must receive.

The architecture described above gives rise to two requirements:

(i) the need for a means for each ingress means to transmit traffic measurements and indications to the cross-bar controller; and (ii) the need for a means for the cross-bar controller to send configuration information to each ingress and each egress means.

It is possible to provide dedicated communications paths to meet these requirements. However such a solution requires additional hardware, which is expensive in terms of increased power consumption, installation and materials.

SUMMARY OF THE INVENTION

It is therefore an object of the invention to obviate or at least mitigate the aforementioned problems.

In accordance with the present invention, there is provided a switching device for user data in the form of cells, the switching device comprising:

a backplane;

a plurality of ingress means connected to an input side of the backplane;

a plurality of egress means connected to an output side of the backplane;

for each ingress means, associated slicing means for converting cells into slices for transfer across the backplane;

for each egress means, associated de-slicing means for reforming the slices into cells; and backplane control means for controlling the backplane in accordance with control slices which are interspersed with slices carrying the user data.

Advantageously, the control slices are spaced in time.

Preferably, the control slices are located in predetermined timeslots.

The present invention has the advantage that it is faster and more efficient, as the use of slices rather than the significantly larger cells allows relatively low data rates for control channels without the consequent increase in latency of control traffic that use of cells would impose. Also, it removes the need for separate control hardware for the backplane.

In one embodiment of the present invention, there is provided a router device having a plurality of ingress line function means, a plurality of egress line function means, a backplane and a controller means, wherein the transmission of signals from the plurality of ingress line function means to the controller means and signals from the controller means to each of the ingress line function means and each of the egress line function means takes place across the backplane.

Other objects, advantages and novel features of the present invention will become apparent from the following detailed description of the invention when considered in conjunction with the accompanying drawings.

BRIEF DESCRIPTION OF THE DRAWINGS

FIG. 3 illustrates the operation of the slices in accordance with the present invention.

DETAILED DESCRIPTION OF THE INVENTION

Figure 1:
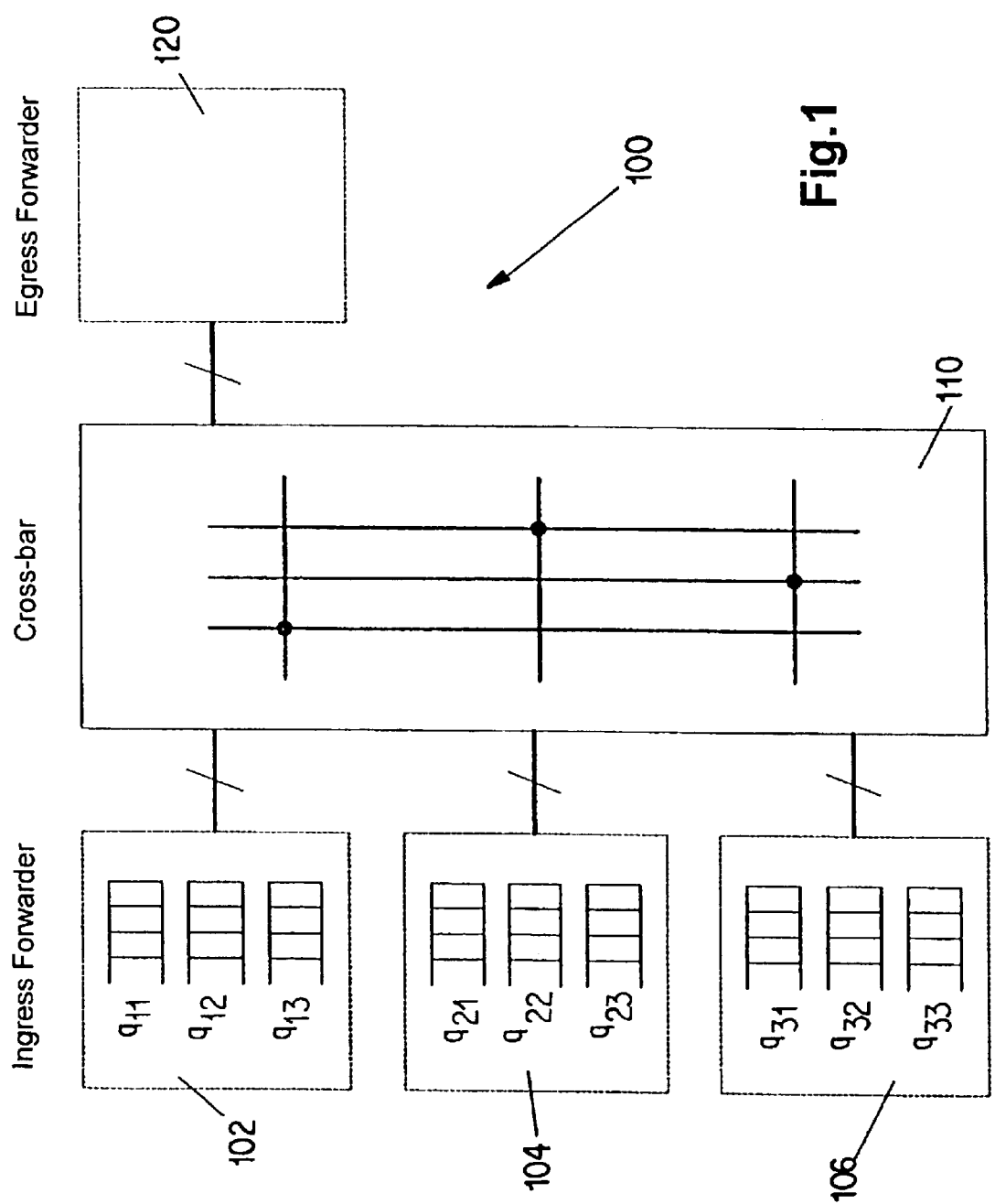
FIG. 1 illustrates a terabit router architecture.

FIG. 1 illustrates a conventional terabit router architecture 100 in which packets arrive at ingress forwarders 102, 104, 106 via their input port(s) (not shown) and are routed across a cross-bar 110 to a correct egress forwarder 120 which transmits them across its output port(s) (not shown). Each ingress forwarder 102, 104, 106 maintains a separate packet queue for each egress forwarder 120.

Ingress forwarder 102 has three queues $q_{11}$, $q_{12}$, $q_{13}$ of data packets ready for transfer to three separate egress forwarders (only egress forwarder 120 being shown). Data in $q_{11}$ is destined for egress forwarder 120 via the cross-bar 110. Similarly, three queues $q_{21}$, $q_{22}$, $q_{23}$ and $q_{31}$, $q_{32}$, $q_{33}$ are formed respectively in each of the ingress forwarders 104, 106. Although three queues are shown in each ingress forwarder 102, it will be appreciated that any number of queues can be present in each ingress forwarder 102, 104, 106.

Generally speaking, each queue may be defined such that j represents the ingress, k represents the egress, and $q_{jk}$ represents the packet queue at the ingress j for the packets destined for egress k.

It will be appreciated that although only one egress forwarder 120 is shown in FIG. 1, the number of egress forwarders will normally be the same as the number of ingress forwarders.

By way of explanation, a cell based cross-bar is characterised as follows:

a) Each ingress line function may be connected to any egress line functions.

b) Each ingress line function may only be connected to one egress line function at a time.

c) Each egress line function may only be connected to one ingress line function at a time.

d) All ingress line functions transmit in parallel across the cross-bar.

e) Data is transmitted across the cross-bar in small fixed sized cells, for example, a cell size is typically 64 octets.

f) Cell transmission is synchronised across all the ingress line functions. This means that for each cell cycle, each ingress line function starts transmitting the next cell at the same time.

g) The cross-bar is reconfigured at the end of every cell cycle.

As shown in FIG. 1, packets of data arriving at the ingress forwarders 102, 104, 106 via their input port(s) (not shown) and are routed across the cross-bar 120 to the correct egress forwarders 120 which transmits them across its output port(s) (also not shown). Each ingress forwarder 102, 104, 106 maintains a separate packet queue for each egress forwarder 120, for example $q_{11}$, $q_{12}$, $q_{13}$, $q_{21}$, $q_{22}$, $q_{23}$, $q_{31}$, $q_{32}$, $q_{33}$.

Figure 2:
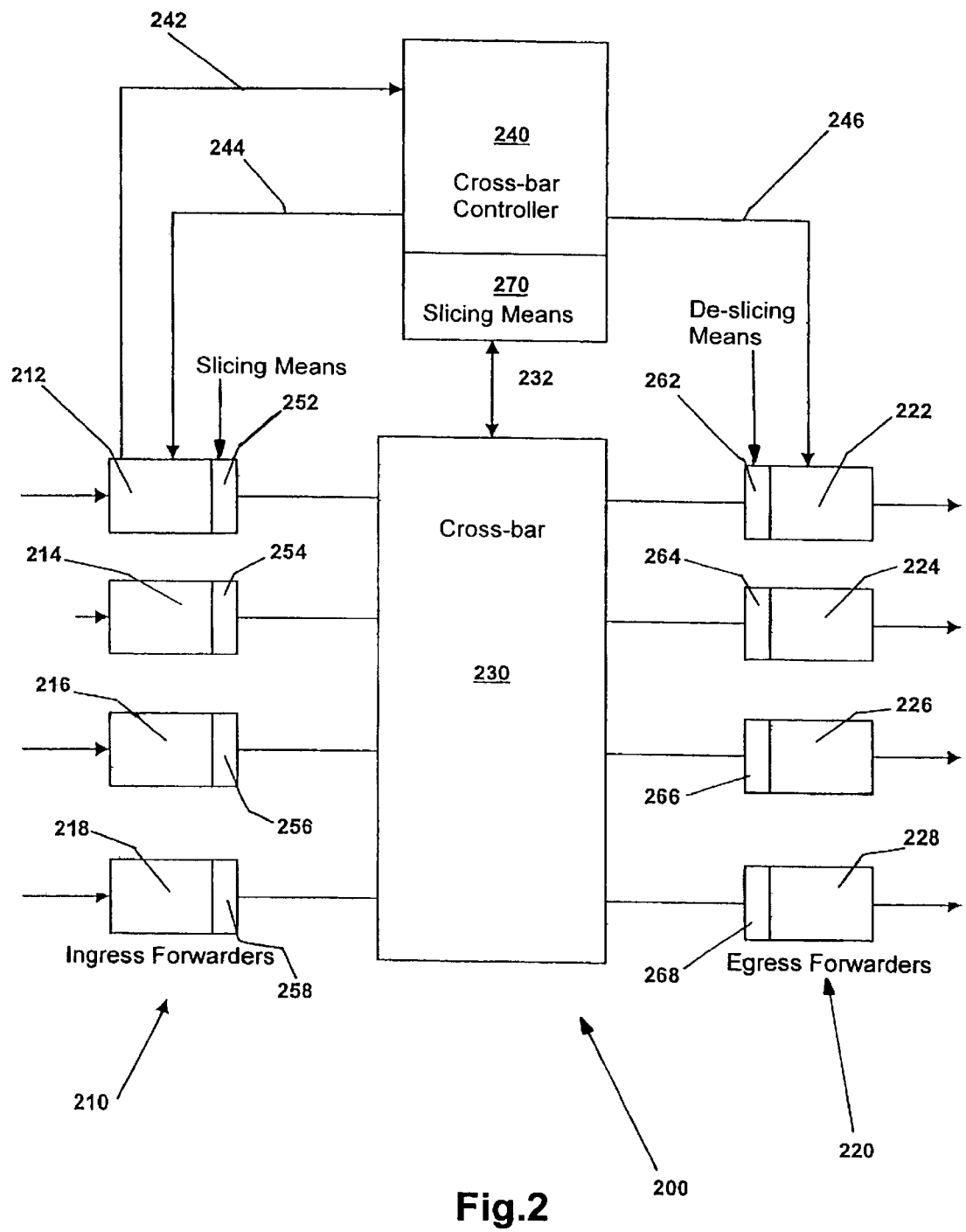
FIG. 2 illustrates a switching device in accordance with the present invention.

A cell based cross-bar arrangement 200 in accordance with the present invention is shown in FIG. 2. The arrangement 200 comprises a plurality of ingress forwarders 210 and a plurality of egress forwarders 220 connected to a cross-bar or backplane 230. Here, each ingress forwarder 212, 214, 216, 218 may be connected to one or more of the egress forwarders 222, 224, 226, 228. However, as mentioned above, each ingress forwarder 212, 214, 216, 218 may only be connected to one egress forwarder 222, 224, 226, 228 at a time and each egress forwarder 222, 224, 226, 228 may only be connected to one ingress forwarder at a time 212, 214, 216, 218.

The cross-bar arrangement 200 is controlled by a cross-bar controller 240 which is physically connected to the backplane 230 via connection 232. The cross-bar controller 240 is also logically connected to each ingress forwarder 212, 214, 216, 218 via logical links 242, 244 and to each egress forwarder 222, 224, 226, 228 via logical link 246. The cross-bar controller 240 coordinates the transmission and reception of cells, via links 242, 244, 246.

The term 'logical link' means that there is no physical connection between the cross-bar controller 240 and the ingress and egress forwarders 212, 214, 216, 218, 222, 224, 226, 228, and all transfer of control information either from or to the cross-bar controller 240 is made via the backplane 230.

Each ingress forwarder 212, 214, 216, 218 communicates traffic measurements and notifications for the use of the cross-bar controller 240, via logical link 242. The cross-bar controller 240 communicates to each ingress forwarder 212, 214, 216, 218 which cell it is to send next, via logical link 244. The cross-bar controller 240 also communicates to each egress forwarder 222, 224, 226, 228 information indicating from which ingress forwarder 212, 214, 216, 218 to receive data, via logical link 246. The cross-bar controller 240 allocates connections between ingress forwarders 212, 214, 216, 218 and egress forwarders 222, 224, 226, 228 and informs the respective forwarders accordingly for each cell cycle in turn.

In accordance with the present invention, the backplane 230 is configured such that data is transmitted thereacross in slices. A slice is a fixed size portion of a cell—typically each cell is subdivided into eight slices.

Each ingress forwarder 212, 214, 216, 218 includes slicing means 252, 254, 256, 258 for dividing cells into slices for transmission across the backplane 230. Each egress forwarder 222, 224, 226, 228 includes de-slicing means 262, 264, 266, 268 for receiving slices from the backplane 230 re-forming the original cells. The backplane 230 deals only with slices and not cells.

Cells are input to ingress forwarders 212, 214, 216, 218, the cells are sliced in the slicing means 252, 254, 256, 258 and transmitted across the backplane 230 to de-slicing means 262, 264, 266, 268 in the egress forwarders 222, 224, 226, 228 and the output from each egress forwarder 222, 224, 226, 228 is in the form of cells.

The ingress and egress forwarders 212, 214, 216, 218, 222, 224, 226, 228 are synchronised so that they each send or receive slices simultaneously. At each slice time, each ingress forwarder 212, 214, 216, 218 will transmit a slice which can be received by one or more egress forwarders 222, 224, 226, 228. Likewise, at each slice time, each egress forwarder 222, 224, 226, 228 can receive a slice from one and only one ingress forwarder 212, 214, 216, 218. Each egress forwarder 222, 224, 226, 228 is responsible for selecting the correct slice.

As the backplane 230 only operates on slices, the cross-bar controller 240 includes a slicing means 270 for providing control information in the form of slices. In accordance with the present invention, the control information from the cross-bar controller 240 is interleaved with user data across the backplane 230.

User data is conveyed across the backplane 230 as cells consisting of some fixed integral number of slices. This is described in more detail with reference to FIG. 3.

In FIG. 3, slice timeslot patterns 302, 304, 306, 308 for each of the ingress forwarders 212, 214, 216, 218 of FIG. 2 are shown. Each slice timeslot pattern 302, 304, 306, 308 is different and comprises a control slice timeslot 312, 314, 316, 318 for carrying control information from the associated ingress forwarder 212, 214, 216, 218 to the cross-bar controller 240, a control slice timeslot 322, 324, 326, 328 for carrying control information from the cross-bar controller 240 to each ingress forwarder 212, 214, 216, 218, and a control timeslot 332, 334, 336, 338 for carrying control information from the cross-bar controller 240 to the egress forwarders 222, 224, 226, 228. As shown, for each ingress forwarder 212, 214, 216, 218, the position of its control slice timeslots 312, 314, 316, 318, 322, 324, 326, 328, 332, 334, 336, 338 is different to each other ingress forwarder.

Data to be transferred across the backplane 230 in the form of slices are fitted into slice timeslots around the control slice timeslots. For example, if ingress forwarder 212 has eight data slices to transmit, it will place the first slice in the first timeslot before control slice timeslot 312, six slices in the next six timeslots following the control slice timeslot 312 and the last slice in the timeslot following the control slice timeslot 322. Similarly, for ingress forwarder 214 having eight data slices to transmit, the first three slices will be placed in the three timeslots prior to the control slice timeslot 314 and the remaining five timeslots will be in the five timeslots following the control slice timeslot 314, and so on.

If ingress forwarder 216 has fifteen slices to transmit, then the first five slices are placed in the first five timeslots, the next six slices are placed in the six timeslots following the control slice timeslot 316, the next two slices are placed in the two timeslots following the control slice timeslot 326, and the remaining two slices are placed in the two timeslots following the control slice timeslot 336. Similarly, for ingress forwarder 218 having fifteen slices to transmit, the first seven slices will be placed in the first seven timeslots, the next six slices will be placed in the six timeslots following the control slice timeslot 318, and the last two slices will be placed in the two timeslots between the control slice timeslots 328 and 338.

For transmission of control information from ingress forwarders 212, 214, 216, 218 to the cross-bar controller 240, each ingress forwarder 212, 214, 216, 218 is assigned a dedicated slice timeslot which it uses to send information to the controller 240. The timeslots do not overlap. When the timeslot assigned to a given ingress forwarder 212, 214, 216, 218 is reached, that ingress forwarder transmits a slice of control information, interrupting its transmission of user data. The cross-bar controller 240 selects the ingress forwarder 212, 214, 216, 218 from which to receive control information according to the current timeslot number.

When receiving user data from a given ingress forwarder 212, 214, 216, 218, an egress forwarder 222, 224, 226, 228 ignores information in a slice timeslot if that timeslot is assigned to the given ingress forwarder for transmission of control information. The position of the control slice timeslot is determined by fixed global information, for example, the position of a forwarder in a physical rack of forwarders or LICs. This makes it simple for each forwarder to determine which slice timeslot is used by each forwarder for this purpose.

For transmission of control information from the cross-bar controller 240 to ingress and egress forwarders 212, 214, 216, 218, 222, 224, 226, 228, the same technique is used except that each forwarder is assigned a dedicated timeslot on which to receive.

Where the backplane 230 supports broadcast traffic, that is, the transmission of information to all ingress and/or egress forwarders simultaneously, this can be achieved by using a single control slice timeslot. All recipients would receive information using this timeslot. Such a control slice timeslot may be in addition to the control slice timeslots 312, 314, 316, 318, 322, 324, 326, 328, 332, 334, 336, 338, or it may replace one or more of such timeslots in accordance with a particular application.

It will be readily understood that although the preceding discussion has been in terms of optical terabit routers, the apparatus of the present invention are capable of implementation in a wide variety of routing devices, including switches and routers, and that these routing devices can be either purely electronic, part electronic/part optical or optical in nature.

What is claimed is:

1. A switching device for user data in the form of cells, the switching device comprising:
   a backplane;
   a plurality of ingress means connected to an input side of the backplane, for transmitting data to said backplane;
   a plurality of egress means connected to an output side of the backplane, for receiving data from said backplane;
   for each ingress means, associated slicing means for converting cells into slices for transfer across the backplane;
   for each egress means, associated de-slicing means for re-forming the slices into cells; and
   backplane control means for controlling the backplane in accordance with control slices which are interspersed with slices containing user data;
   wherein the control slices are located in predetermined timeslots within a sequence of slices that are transferred across said backplane.

2. A device according to claim 1, wherein the control slices are spaced in time.

3. The switching device according to claim 1, wherein each ingress means has a dedicated timeslot for sending control slice information to said backplane control means.

4. The switching device according to claim 3, wherein dedicated timeslots for the respective ingress means do not overlap.

5. A switching device for transmitting message data in the form of cells, said switching device comprising:

a plurality of ingress devices;

a plurality of egress devices;

a backplane connected to receive data from said ingress devices and transfer it to egress devices in accordance with control information; and a backplane control device connected to said backplane, for receiving and generating control information for controlling the transfer of data from said ingress devices to said egress devices; wherein, each of said ingress devices includes an associated slicing means for converting cells into slices for transfer across the backplane;

each of said egress devices includes an associated de-slicing means for re-forming said slices into cells;

said backplane control device controls timing and routing of slices across the backplane in a synchronous manner, according to control information; and communication of control information between said ingress and egress devices, said backplane, and said backplane control device takes place across said backplane, via control slices which contain said control information and are interspersed within message data slices, as said message data slices are transferred across the backplane.

6. The switching device according to claim 5, wherein said control slices are situated in predetermined time slots within a sequence of slices that are transferred across said backplane.

7. The switching device according to claim 5, wherein each ingress devices has a dedicated timeslot for sending control slice information to said backplane control means.

8. The switching device according to claim 7, wherein dedicated timeslots for the respective ingress devices do not overlap.

* * * * *